(12) United States Patent
Scharkowski et al.

(10) Patent No.: US 12,293,860 B2
(45) Date of Patent: May 6, 2025

(54) FLAT CONDUCTORS CONNECTED BY A FLEXIBLE CONDUCTOR AND METHOD FOR MANUFACTURING SAME

(71) Applicant: Auto-Kabel Management GmbH, Hausen i.W. (DE)

(72) Inventors: Oliver Scharkowski, Guben (DE); Marie Redder, Ebnat-Kappel (CH); Kabelo Sebetlela, Berlin (DE)

(73) Assignee: Auto-Kabel Management GmbH, Hausen i. W. (DE)

( * ) Notice: Subject to any disclaimer, the term of this patent is extended or adjusted under 35 U.S.C. 154(b) by 375 days.

(21) Appl. No.: 17/913,117

(22) PCT Filed: Mar. 10, 2021

(86) PCT No.: PCT/EP2021/056025
§ 371 (c)(1),
(2) Date: Sep. 20, 2022

(87) PCT Pub. No.: WO2021/190926
PCT Pub. Date: Sep. 30, 2021

(65) Prior Publication Data
US 2023/0207153 A1    Jun. 29, 2023

(30) Foreign Application Priority Data
Mar. 25, 2020 (DE) ............ 10 2020 108 150.2

(51) Int. Cl.
*H01B 7/08* (2006.01)
*H01R 12/61* (2011.01)
*H01R 43/02* (2006.01)

(52) U.S. Cl.
CPC ........... *H01B 7/0807* (2013.01); *H01R 12/61* (2013.01); *H01R 43/0207* (2013.01)

(58) Field of Classification Search
None
See application file for complete search history.

(56) References Cited

U.S. PATENT DOCUMENTS

| 5,093,988 A * | 3/1992 | Becker ............... H01H 1/5822 |
| | | 219/121.64 |
| 6,896,562 B2 * | 5/2005 | Takizawa ............. H02K 3/50 |
| | | 439/874 |

(Continued)

FOREIGN PATENT DOCUMENTS

| DE | 102016124583 B3 | 2/2018 |
| DE | 102018116599 A1 | 1/2020 |

(Continued)

OTHER PUBLICATIONS

European Patent Office, International Search Report and Written Opinion for PCT application PCT/EP2021/056025 dated Jun. 7, 2021, with English translation of ISR, 16 pages.

(Continued)

*Primary Examiner* — Oscar C Jimenez
(74) *Attorney, Agent, or Firm* — Sunstein LLP

(57) ABSTRACT

An electrical conductor comprising a flat conductor formed of a solid metallic material, the flat conductor having at least two opposite broad sides, two opposite narrow sides and two opposite end sides and having an at least quadrangular cross-sectional profile, and a flexible conductor formed of a plurality of strands, the strands of the flexible conductor being at least partially joined to one another in a materially bonded manner in the region of at least one end of the flexible conductor, characterized in that the flexible conductor, at its end with the joined strands, is joined in a materially bonded manner with its end face to an end face, a narrow side or broad side of the flat conductor.

12 Claims, 9 Drawing Sheets

(56) References Cited

U.S. PATENT DOCUMENTS

| | | | |
|---|---|---|---|
| 9,236,701 B2* | 1/2016 | Nabeta | H01R 4/027 |
| 10,978,815 B2 | 4/2021 | Scharkowski | |
| 11,489,271 B2* | 11/2022 | Scharkowski | H01R 4/023 |
| 2014/0312097 A1* | 10/2014 | Miyazato | H01R 43/0207 |
| | | | 228/1.1 |

FOREIGN PATENT DOCUMENTS

| | | |
|---|---|---|
| EP | 2209161 A1 | 7/2010 |
| WO | 2020/018510 A1 | 1/2020 |

OTHER PUBLICATIONS

German Patent Office, Office Action issued in application DE 102020108150.2 dated Jun. 15, 2021, 4 pages.

German Patent Office, Office Action issued in application DE 102020108150.2 dated Dec. 4, 2020, 5 pages.

\* cited by examiner

FLAT CONDUCTORS CONNECTED BY A FLEXIBLE CONDUCTOR AND METHOD FOR MANUFACTURING SAME

CROSS-REFERENCE TO RELATED APPLICATIONS

This application is the national phase entry of international patent application no. PCT/EP2021/056025 filed Mar. 10, 2021 and claims the benefit of German patent application No. 10 2020 108 150.2 filed Mar. 25, 2020, the disclosures of which are incorporated herein by reference in their entirety.

TECHNICAL FIELD

The subject matter relates to an electrical conductor, in particular a connection between two electrical conductors, as well as a method for manufacturing such a conductor or such a connection.

BACKGROUND ART

The use of electrical conductors, in particular in the form of busbars, is becoming increasingly important in automotive applications. Busbars have a very good current-carrying capacity and are easy to install. Busbars are generally rather inflexible, so that the conductor path within a vehicle must be predetermined and threading the busbar through narrow openings or laying it in tight installation spaces is hardly possible. To meet this requirement, a flexible conductor, in particular a stranded conductor, is usually attached to the busbar, which is then threaded through the narrow installation space starting from the busbar and/or is routed to a consumer. However, arranging the flexible conductor on the flat conductor, which forms the busbar, has disadvantages in terms of the installation space used. If the flexible conductor is arranged on the broad surface of the flat conductor, the overall height of the entire connection is thereby increased, which can be disadvantageous in limited installation spaces.

The subject matter was therefore based on the object of providing an electrical conductor as well as a connection which enables the use of busbars in confined installation spaces.

SUMMARY OF THE INVENTION

The electrical conductor extends over a connection of two conductors. A first conductor is a flat conductor formed from a solid metallic material. A metallic solid material may be, for example, copper or a copper alloy as well as aluminum or an aluminum alloy. Aluminum Al 99.5, E-Aluminum or the like is particularly suitable. The aluminum may be soft annealed to make the flat conductor flexible.

The flat conductor has an at least quadrangular cross-sectional profile with two opposite broad sides, two opposite narrow sides, and two opposite end sides. The broad sides and narrow sides extend along the longitudinal axis of the flat conductor.

In addition, a flexible conductor formed from a plurality of strands, which may also be metallic, is provided. The material of the flexible conductor may be formed in accordance with the material of the flat conductor, as described above. Flexible conductor and flat conductor may be formed of the same metallic material so that a single material connection is formed. Also, it is possible that flat conductor and flexible conductor are formed of metallic materials different from each other. For example, it is preferred that the flat conductor is formed of aluminum or an aluminum alloy and the flexible conductor is formed of copper or a copper alloy. It is also possible that the flat conductor is formed of copper or a copper alloy and the flexible conductor is formed of aluminum or an aluminum alloy.

For joining the stranded conductor to flat conductors, it is first proposed that the strands of the flexible conductor are at least partially materially bonded to one another in the region of at least one end of the flexible conductor. The flexible conductor then forms a complete or partial weld node in the region of its end face. The strands may be fully joined together. It is also possible for the strands arranged on the circumferential side of the flexible conductor to be joined to one another. In particular, the flexible conductor may also have an at least quadrangular cross-sectional profile, preferably a rectangular cross-sectional profile. The flexible conductor can have narrow sides, broad sides and end sides corresponding to the flat conductor.

For a connection between the flat conductor and the flexible conductor that is limited in terms of installation space, it is now proposed that the flexible conductor is butt-jointed at its end with the joined strands with its end face to an end face or a narrow side of the flat conductor. The stranded conductor or the strands of the stranded conductor are at least partially joined to each other at the end face. This material bond connection of the strands to one another at the end face of the stranded conductor enables the end face of the stranded conductor to be butt-jointed to a narrow side or end face of the flat conductor. In this butt joining, the strands or the end faces of the strands are butt joined to the surface of the flat conductor. The height of the flat conductor is greater than, equal to or less than the height of the stranded conductor. Thus, the stranded conductor can be placed completely with its end face against a narrow side or end face of the flat conductor, where it is joined by a material bond.

The flexible conductor can be formed hinge like between two flat conductors. For this purpose, the flexible conductor can be butt-jointed on both sides to a flat conductor in the manner described. For this reason, it is also proposed that the strands of the flexible conductor are at least partially butt-jointed to each other at its two distal ends.

After this joining of the strands at the end faces of the flexible conductor has been carried out, they can be butt joined to a narrow side, end face or broad side of a respective flat conductor. It is therefore proposed that the flexible conductor is butt-jointed to the flat conductor at its two distal ends, each with its end face. This results in the flexible conductor being arranged hinge like between two flat conductors. The flat conductor is generally flexurally rigid, i.e. it does not deform plastically due to its own weight. The flexible conductor, on the other hand, is flexurally slack, so it deforms plastically due to its own weight. The flexible conductor between the flat conductors makes it possible to move the flat conductors relative to each other in almost any spatial direction.

According to an embodiment, it is proposed that the flexible conductor is a conductor braid, in particular a flat conductor braid. These conductor braids are characterized on the one hand by a high current-carrying capacity due to the high number of strands and on the other hand by a high degree of mechanical flexibility due to the braiding of the strands. Thus, a current of several 10 A or several 100 A can also be conducted via a corresponding stranded conductor, so that the stranded conductor can form a connection between two battery flat conductors.

In particular, in the powertrain area, the stranded conductor can connect two flat conductors or one flat conductor to a battery and/or a motor. Also, the stranded conductor can be used to connect battery cell connectors or battery module connectors. Battery cells are connected together to form a battery module. Multiple modules are connected together using module connectors. Battery modules usually have terminal lugs in the form of flat conductors. The flat conductors or module connectors mentioned can be understood as battery flat conductors. These battery flat conductors can be connected to each other via the described connection to the flexible conductor so that the modules can be moved relative to each other. In particular, tolerance compensation can be performed via the flexible conductor. Also, a mechanically induced or thermally induced movement of the modules relative to each other can be compensated via the flexible conductor.

According to an embodiment, it is proposed that the strands of the flexible conductor are at least partially joined to one another in the region of at least one of its ends by means of ultrasonic welding or resistance welding. When the strands are joined together, they are pressed against each other during resistance welding or ultrasonic welding and welding energy is applied. The surfaces of the strands melt in the process and join together intermetallically, so that a weld node is formed in the end face area of the stranded conductor.

This weld node, which forms the end face and can be fully or partially formed, can in turn be joined to the end face, narrow side or broad side of the flat conductor by means of resistance welding, in particular resistance pressure butt welding or flash butt welding, or laser welding.

A materially bonded joining of the stranded conductors to one another is facilitated in particular by the fact that a plate-shaped fixation is arranged on the strands of at least one broad side of the flexible conductor in the region of at least one of its ends. A plate-shaped fixation may be referred to as a plate or platelet. The plate-shaped fixation may be formed of a metallic material, in particular of the same material as the strands of the stranded conductor. It is also possible that the material of the plate-shaped fixation corresponds to the material of the flat conductor and is different from the material of the stranded conductor.

The plate-shaped fixation is applied to at least one broad side, preferably to opposite broad sides of the stranded conductor in the region of its end face. Subsequently, suitable processes, for example resistance welding or laser welding, are used to effect a material bond between the surface of the plate-shaped fixation facing the stranded conductor and the peripheral strands of the stranded conductor.

During the subsequent butt joining of the strands of the stranded conductor to the flat conductor, as described above, a butt joining of the end faces of the plate-shaped fixation to the flat conductor takes place simultaneously. The flexible conductor together with the plate-shaped fixation, whether on one or both sides, preferably has a total height equal to or less than the total height of the flat conductor. Thus, the butt joint between the flat conductor and the flexible conductor together with the fixation occurs entirely in the area of the end face or the side face of the narrow side. Advantageously, the overall connection does not build up higher than the flat conductor itself.

The connection described above can also be butt-jointed to a broad side of the flat conductor.

As already explained, the strands can be compacted and butt-jointed to two plate-shaped components arranged on opposite broad sides. In the case of material bonding, the strands can be sewn to the plate-shaped fixation. This can be done by means of a laser. The laser can form a "weld channel" extending between the opposing plate-like fixations. This is a channel of strands welded together along a straight line between the two plate-shaped fixations, the strands in turn also being materially bonded to the plate-shaped fixations.

A welding channel can extend from a first plate-shaped fixture in the direction of the strands. This welding channel can extend through the strands into the second plate-shaped fixture.

It is proposed that the welding channel extends in the longitudinal direction of the plate-shaped fixings, pointing away from their end face in the direction of the stranded conductor.

A welding channel may be continuous in the longitudinal direction. It is also possible for a plurality of welding channels to be introduced one after the other, spaced apart from one another, in the longitudinal direction.

It is also possible that in the transverse direction, i.e. preferably perpendicular to the longitudinal direction, two or more welding channels are arranged spaced apart next to one another.

Preferably, the welding channel is introduced by means of laser welding. The laser weld seam(s) can be welded through all three layers, thereby producing a material-to-material bond. The welding channel can go through the strands starting from a first plate-shaped fixture, with the welding root at one of the plate-shaped fixtures.

In addition to through-welding, it is also possible for a weld seam to be introduced into each of the strands, starting in each case from one of the plate-shaped fixings, and for the weld seams to meet in the area of the strands. This also enables a continuous weld seam.

In this case, it is possible to have two weld roots meet, which is particularly advantageous for very thick material layers.

In particular, one laser weld is set by the upper plate-shaped fixture and the opposite one by the lower plate-shaped fixture. In the central area of the strands, the weld roots meet and join to form a materially bonded connecting channel.

Preferably, the weld seams/weld roots run parallel to a surface normal of at least one of the plate-shaped fixations.

However, the weld seams (weld roots) can also be set at an acute angle to the surface normal of at least one of the plate-shaped fixations.

The weld seams (weld roots) can run in such a way that they intersect in the area of the strands or run at an angle to each other, i.e. do not intersect. With respect to the surface normal of at least one of the plate-shaped fixations, the angle α can be inclined in one direction in each case, preferably up to 45°.

When applying the plate-shaped fixation, a mechanical deformation of the strands may occur. This can result in the strands having different lengths and no longer having a flat end face of the stranded conductor. Also, the plate-shaped fixation can be placed on the broad side or broad sides in such a way that it is ensured that all strand ends protrude beyond the face of the plate-shaped fixation. This ensures that when the flexible conductor is subsequently joined to the flat conductor, all strands of the flexible conductor can come into contact with the end face or narrow side of the flat conductor, resulting in the ohmic resistance of the transition being low.

To ensure this, it is proposed that in a trim cut the strands in the area of the end face of the flexible conductor are cut flat with an end face of the fixture. A trim cut can be made, for example, by means of a laser. In this case, the strands can be cut to length along the end face of the fixture in a single work step. Milling over or cutting is also possible and can be understood as a trim cut.

In the subsequent butt joint between the strands and the flat conductor, the fixation is additionally joined with the narrow side or the end face of the flat conductor in a material bond. Such joining can be carried out, for example, by means of laser welding, which is guided circumferentially at least partially along the mechanically formed connection between the strands of the flexible conductor and the fixation on the one hand and the narrow side or end face of the flat conductor on the other.

If the strands of the flexible conductor are placed against the narrow side or end face of the flat conductor, with or without fixation, a joint line is formed. The materials lie against each other along this joint line. By means of a suitable holding device, the materials are pressed together and then at least partially, preferably completely, circumferentially welded together. Laser welding or resistance welding can be used, for example.

BRIEF DESCRIPTION OF THE DRAWINGS

The subject matter is explained in more detail below with reference to a drawing showing embodiments. The drawings show.

As already explained, flat conductors are connected to flexible conductors. Flat conductors with and without insulation as well as flexible conductors with and without insulation are used.

DETAILED DESCRIPTION OF SPECIFIC EMBODIMENTS

Figure 1A:
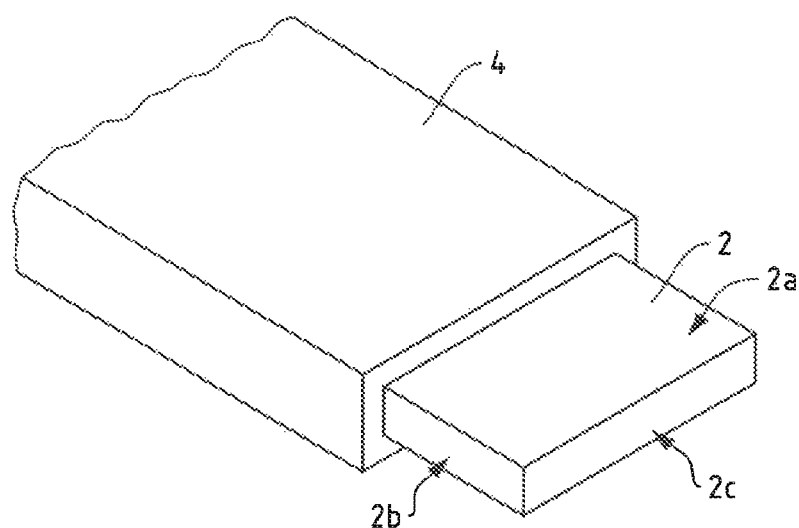
FIG. 1a, b respectively a flat conductor and a flexible conductor.

FIG. 1a shows a flat conductor 2 with insulation 4. It can be seen that the flat conductor 2 has a rectangular cross-sectional profile with two opposite broad sides 2a, two opposite narrow sides 2b and two end sides 2c. The broad side 2a as well as the narrow side 2b extend in the longitudinal direction of the conductor 2. The conductor 2 is freed from the insulation 4 at least in the area of the end face 2c.

Figure 1B:
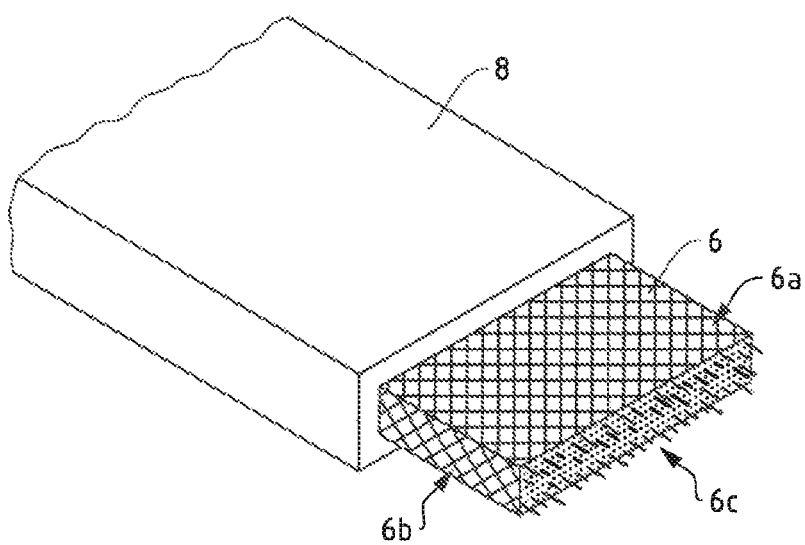

A corresponding structure can also be selected for a flexible conductor 6, as shown in FIG. 1b. The flexible conductor 6, can be formed as a conductor braid from a plurality of strands, which can optionally be surrounded by an insulation 8. The flexible conductor 6 also has a rectangular cross-sectional profile with two opposite broad sides 6a, two opposite narrow sides 6b and two end sides 6c.

Figure 2A:
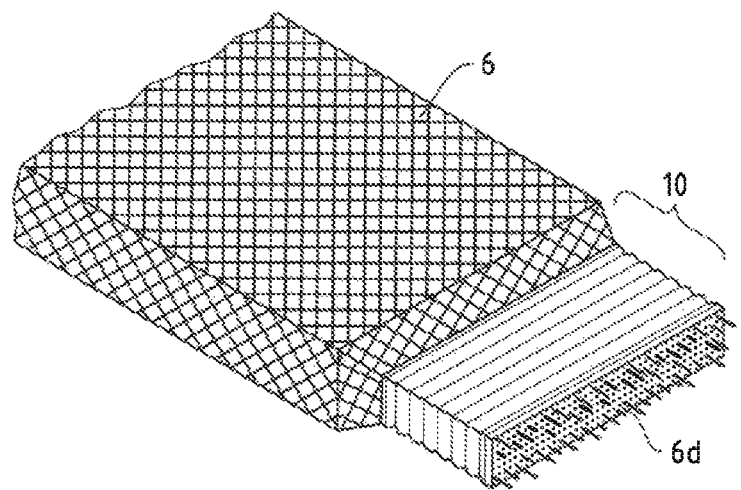
FIG. 2a-d flexible conductors with compacted areas in the region of the end face.

For a connection of the end face 6c butt to an end face 2c or a narrow side 2b of a flat conductor 2, as shown in FIG. 2a, the flexible conductor 6 is compacted in an end face area 10 in such a way that the strands 6d of the flexible conductor 6 are at least partially connected to each other by a material bond. The area 10 can be compacted, for example, by ultrasonic welding, resistance welding or the like. The strands 6d are pressed onto each other and at least the peripheral strands enter into a material bond with each other. An end face 6c compacted in this way can be butt joined to the flat conductor 2, as will be described below.

Figure 2B:
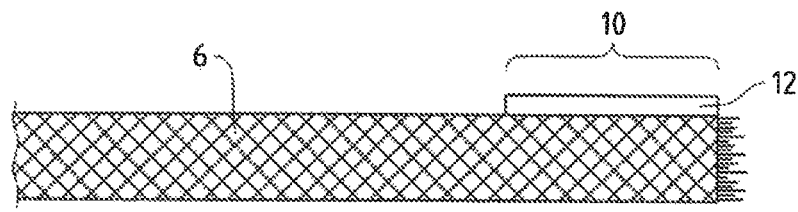

FIG. 2b shows another way of compacting the area 10. For this purpose, a plate-shaped fixing element 12 is placed on the broad side 6a of the flexible conductor 6 in the area 10. Subsequently, the plate-shaped fixing element 12 is pressed against the broad side 6a and welded to the strands 6d of the flexible conductor 6 lying on this broad side 6a by means of ultrasonic or resistance welding. During this welding, moreover, an intermetallic connection may be made between at least some of the strands 6d in the fixing element 12.

Figure 2C:
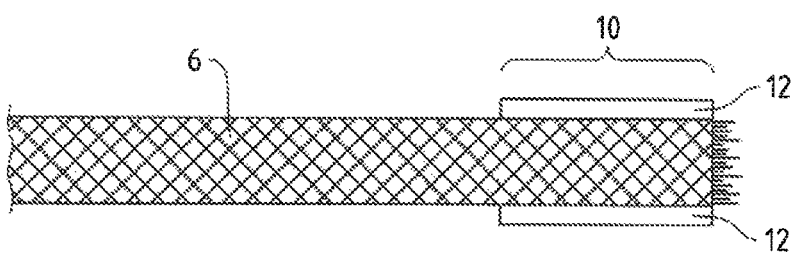

FIG. 2c shows another embodiment, in which plate-shaped fixing elements 12 are placed on both sides of the flexible conductor 6 opposite each other on broad sides 6a in the area 10. Subsequent compacting can be carried out in the manner described above. In this welding, moreover, an intermetallic connection may be made between at least some of the strands 6d in the respective fixing elements 12.

Figure 2D:
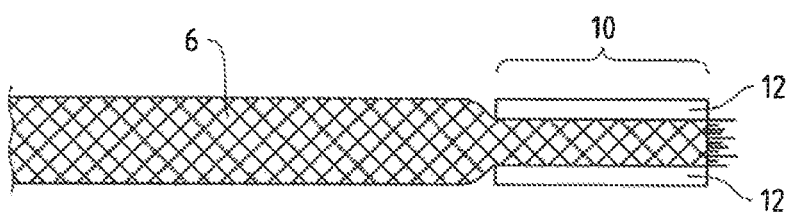

FIG. 2d shows a further embodiment in which the plate-shaped fixing elements 12 are pressed onto the broad sides 6a of the flexible conductor 6 in such a way that the latter is compressed in its height h. In particular, the compression is such that the height h of the combination of plate-shaped fixing elements 12 and flexible conductors 6 in the region 10 is equal to the height h of the flexible conductor 6 outside the region 10. During welding, moreover, an intermetallic connection may be made between at least some of the strands 6d in the respective fixing elements 12.

Figure 3:
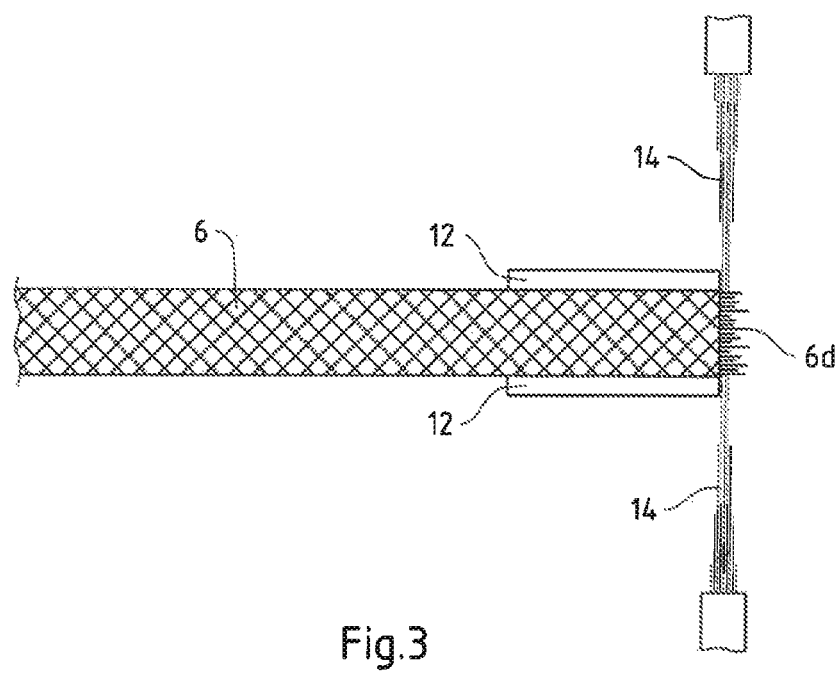
FIG. 3 a schematic representation of a trim cut.

During compacting of the area 10 according to the embodiments according to FIGS. 2a-d, the strands 6d may not be flush with the end surface of the plate-shaped fixing elements 12 or may be flush with each other. In order to be able to provide a planar contact surface, it is proposed that the strands 6d, as shown in FIG. 3, are cut planar to the plate-shaped fixing elements 6 by means of a trim cut, in particular with a laser 14. This ensures a planar surface formed from the end faces of the plate-shaped elements 12 as well as the strands 6d.

A plane surface of the end face 6c produced in this way can then be butt-welded to a flat conductor 2. This is shown by way of example in FIG. 5. The flat conductor 2 is brought with its end face 2c up to the flexible conductor 6, in particular the end face 6c. Both the strands 6d and the end faces of the plate-shaped fixing elements 12 are in direct contact with the end face 2c of the flat conductor 2. During mechanical fixing, a welding energy, for example by means of resistance welding or laser welding, is applied to this joint. This forms a material connection between the flat conductor 2 and the flexible conductor 6.

During laser welding, a laser welding device can be guided circumferentially around the seam between the flat conductor 2 and the flexible conductor 6 at least in part, thus forming a circumferential weld seam that projects only partially into the flexible conductor 6. This circumferential weld seam preferably includes both the plate-shaped fixing elements 12 and at least parts of the strands 6d.

Figure 4A:
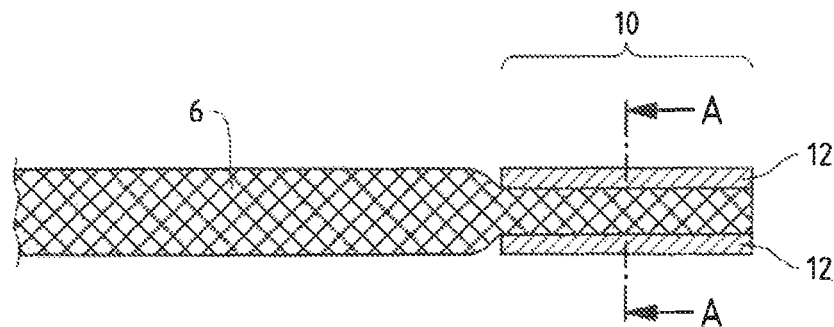
FIG. 4a-f various designs of welded seams.

FIG. 4a shows a longitudinal section through the area 10 with the flexible conductor 6 and the fixing elements 12 before sewing.

Figure 4B:
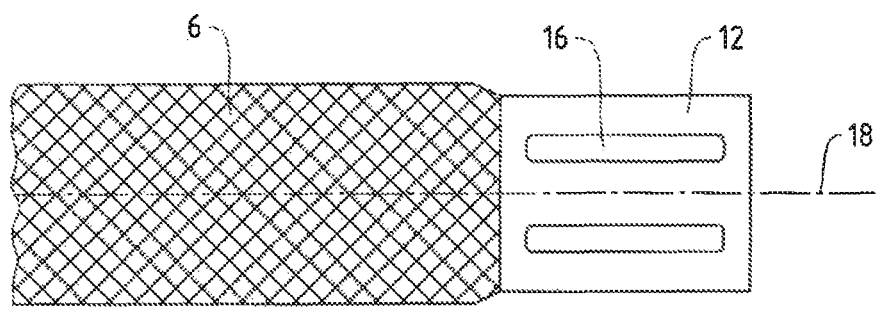

FIG. 4b shows a top view of a fixing element 12. It can be seen that two weld seams 16 extend continuously along a longitudinal axis 18 side by side on the fixing element 12.

These weld seams 16 are preferably parallel to each other. The weld seams 16 extend into the flexible conductor 6. Preferably, the weld seams 16 extend into the opposite flexible element 12.

Figure 4C:
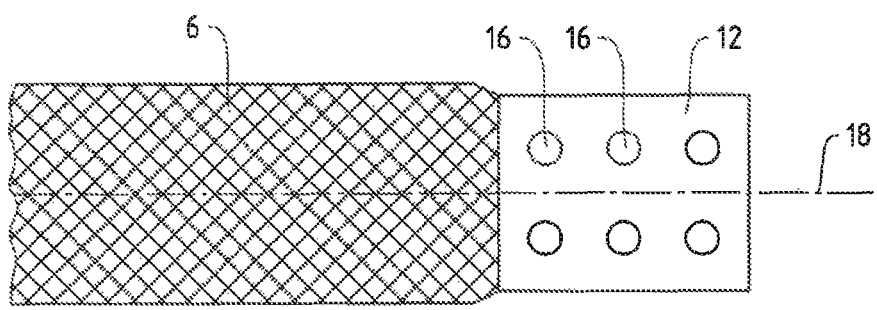

FIG. 4c shows a top view of a fixing element 12. It can be seen that a plurality of weld seams 16 extend in a point-like manner along a longitudinal axis 18 next to and behind each other on the fixing element 12. The weld seams 16 each extend into the flexible conductor 6. Preferably, the welds 16 extend into the opposite flexible member 12.

Figure 4D:
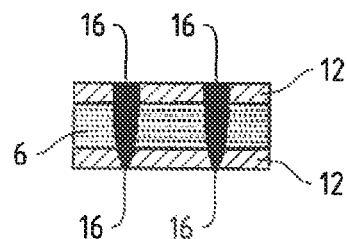

FIG. 4d shows a cross-section along section line A-A according to FIG. 4a. It can be seen that the respective weld seams 16 each extend into the flexible conductor 6 and the two fixing elements 12. In this case, a weld seam 16 may extend into the material of the flexible conductor 6 in a funnel-shaped manner. In FIG. 4d, a respective weld seam 16 extends across the entire material thickness of the flexible conductor 6 and into the fixing elements 12.

Figure 4E:
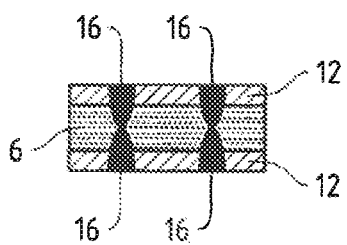

FIG. 4e shows a cross-section along section line A-A according to FIG. 4a. It can be seen that the respective weld seams 16 extend from one of the fixing elements 12 in each case into the flexible conductor 6. In this case, a weld seam 16 can extend into the material of the flexible conductor 6 in the shape of a funnel. In FIG. 4e, a respective weld seam 16 extends only into parts of the material thickness of the flexible conductor 6. The weld seams 16 meet within the flexible conductor 6. The weld seams 16 run parallel to a surface normal on the fixing elements 12.

Figure 4F:
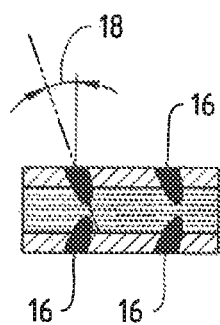

FIG. 4f shows a cross-section along section line A-A according to FIG. 4a. It can be seen that the respective weld seams 16 each extend into the flexible conductor 6 starting from one of the fixing elements 12. In this case, a weld seam 16 can extend into the material of the flexible conductor 6 in the shape of a funnel. In FIG. 4f, a respective weld seam 16 extends only into parts of the material thickness of the flexible conductor 6. The weld seams 16 do not meet within the flexible conductor 6. The weld seams 16 extend at an angle 18 between preferably more than 0° and 45° to a surface normal 20 of the fixing elements 12.

Figure 5:
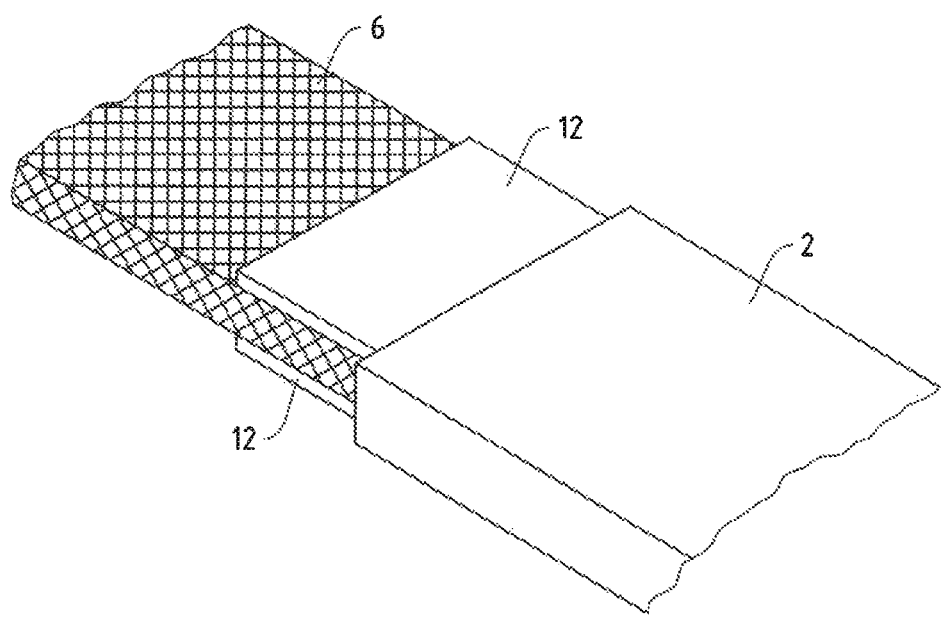
FIG. 5 an end face butt joint between flexible conductor and flat conductor.
Figure 6A:
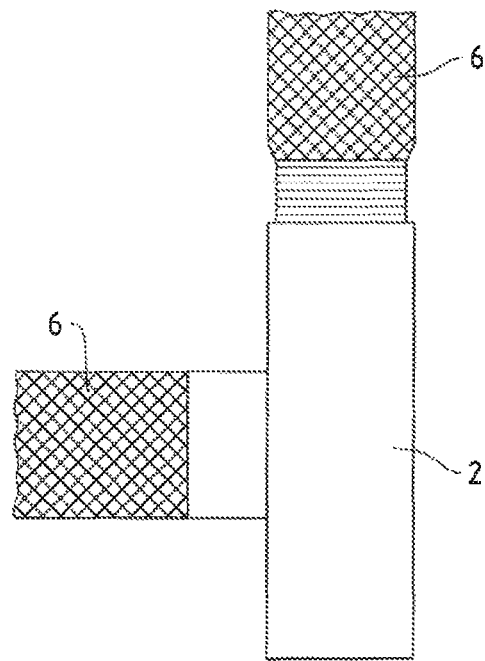
FIG. 6a-c different variants of butt joints according to embodiments.
Figure 6B:
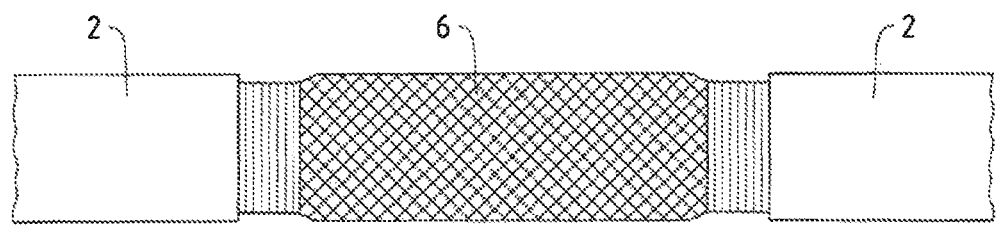
Figure 6C:
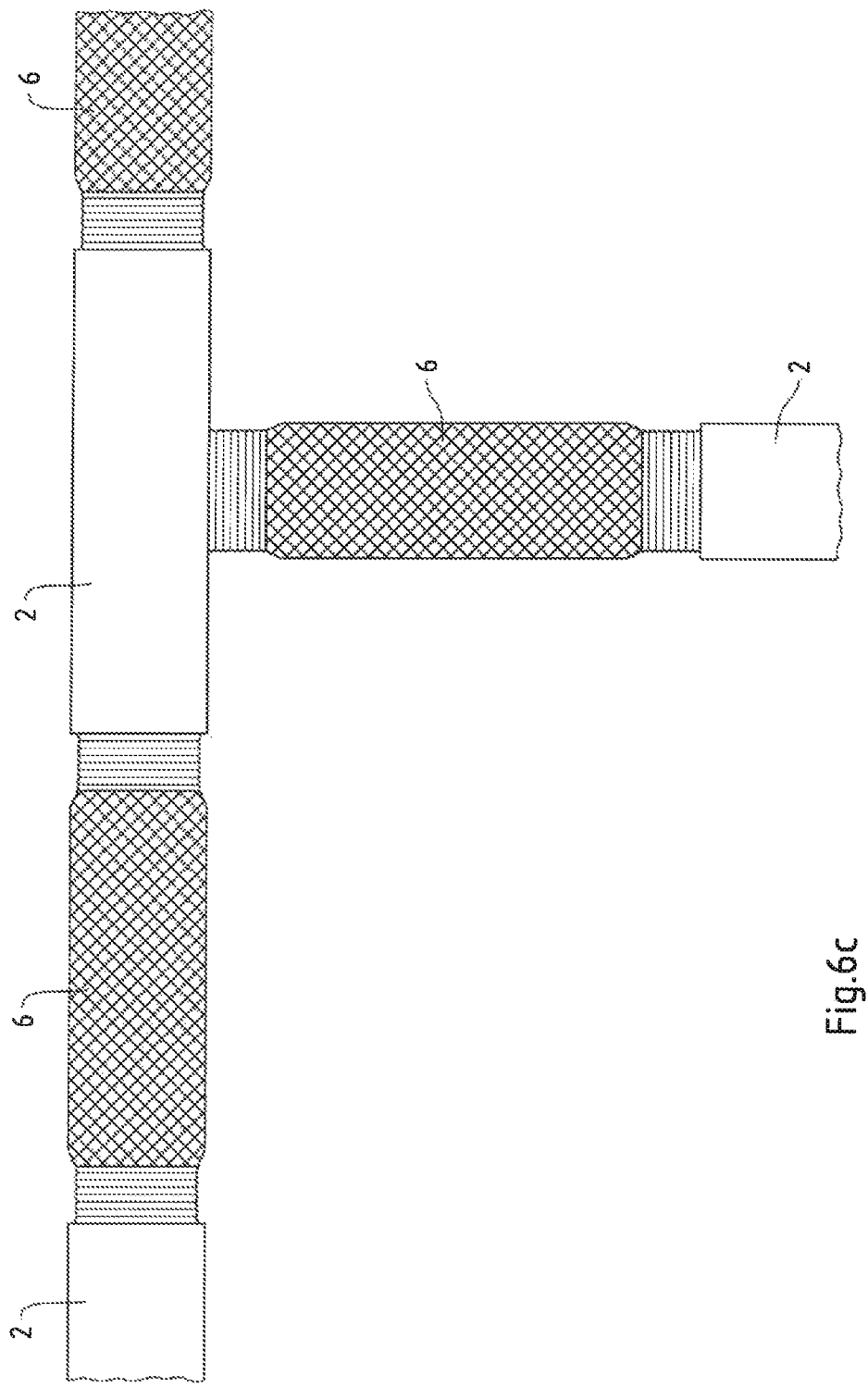

A butt joint, as shown in FIG. 5, does not necessarily have to be made at the end face. Rather, a flat conductor 2, as shown in FIGS. 6a-c, can be joined to a flexible conductor 6 in various ways, with a butt joint being made on the end face or along a narrow side in each case. FIG. 6a shows that a flexible conductor 6 according to FIG. 2c is joined to a narrow side 2b of the flat conductor 2, and a flexible conductor 6 according to FIG. 2a is joined to an end face 2c of the flat conductor 2.

FIG. 6b shows a flexible conductor 6 as shown in FIGS. 2a-d, which is joined to a flat conductor 2 on both sides, i.e. on both its end faces 6c, in the manner described above. The flexible conductor 6 thus serves as a hinge between the flat conductors 2.

Also, as shown in FIG. 6c, a plurality of flat conductors 2 can be joined to each other via flexible conductors 6, wherein the flexible conductors 6 are each connected with their end faces 6c to an end face 2c or a narrow side 2b of a respective flat conductor 2.

The embodiment according to FIG. 6b is particularly suitable for use of a battery module connector, wherein the flat conductors 2 can be terminal lugs of a respective battery module.

What is claimed is:

1. An electrical conductor comprising:
    two flat conductors formed from a solid metallic material, wherein the flat conductors each have at least two mutually opposite broad sides, two mutually opposite narrow sides and two mutually opposite end sides and an at least quadrangular cross-sectional profile, and
    a flexible conductor formed from a plurality of strands, wherein the strands of the flexible conductor are at least partially joined to one another in the region of two distal ends of the flexible conductor by material bonding prior to butt joining end faces of the two distal ends to the flat conductors,
    wherein the end faces of its two distal ends are butt joined to the flat conductor, wherein the end faces of the two distal ends are joined to the end sides or the narrow sides of the flat conductors providing a hinge between the two flat conductors.

2. The electrical conductor of claim 1, wherein the flexible conductor is a conductor braid, in particular a flat conductor braid.

3. The electrical conductor of claim 1, wherein
    the strands of the flexible conductor are at least partially joined to one another in the region of at least one of its ends by means of ultrasonic welding or resistance welding, in particular resistance pressure butt welding or flash butt welding.

4. The electrical conductors of claim 1, wherein
    the flexible conductors are joined to the end face side or the narrow side of the flat conductor by means of resistance welding or laser welding.

5. The electrical conductor of claim 1, wherein
    a plate-shaped fixation is arranged on the strands of at least one broad side of the flexible conductor in the region of at least one of its ends.

6. The electrical conductor of claim 5, wherein
    the fixation is arranged on opposite broad sides of the flexible conductor.

7. The electrical conductor of claim 6, wherein
    the fixation is materially bonded to the stranded conductors.

8. The electrical conductor of claim 5, wherein
    the fixation is formed from at least two plate-shaped components.

9. The electrical conductor of claim 5, wherein
    the strands are cut to length in the region of the end face of the flexible conductor so as to be planar with an end face of the fixing by means of a trim cut.

10. The electrical conductor of claim 5, wherein
    the strands together with the fixation are materially bonded to the narrow side or the end side of the flat conductor.

11. The electrical conductor of claim 5, wherein
    strands together with the fixation are at least partially circumferentially materially bonded to a narrow side or an end side of the flat conductor.

12. A method of manufacturing an electrical conductor comprising:
    providing two flat conductors formed from a solid metallic material, wherein the flat conductors have at least two opposite broad sides, two opposite narrow sides and two opposite end sides and an at least quadrangular cross-sectional profile, and
    providing a flexible conductor formed of a plurality of strands, and
    at least partially joining the strands of the flexible conductor to one another in the region of at least one end of the flexible conductor by a material bond,
    wherein the strands of the flexible conductor first are at least partially joined to one another by material bonding at its two distal ends and then butt joining its end faces of its two distal ends to the end sides or the narrow sides of the flat conductors providing a hinge between the two flat conductors.

* * * * *